United States Patent
Kim et al.

(10) Patent No.: US 9,979,002 B2
(45) Date of Patent: May 22, 2018

(54) SEPARATOR FOR ELECTROCHEMICAL DEVICE AND MANUFACTURING METHOD THEREOF

(71) Applicants: LG Chem, Ltd., Seoul (KR); TORAY INDUSTRIES, INC., Tokyo (JP)

(72) Inventors: Jin-Woo Kim, Daejeon (KR); Joo-Sung Lee, Daejeon (KR); Jong-Hun Kim, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 69 days.

(21) Appl. No.: 14/447,713

(22) Filed: Jul. 31, 2014

(65) Prior Publication Data
US 2014/0342237 A1 Nov. 20, 2014

Related U.S. Application Data

(63) Continuation of application No. PCT/KR2013/010518, filed on Nov. 19, 2013.

(30) Foreign Application Priority Data

Nov. 19, 2012 (KR) .................. 10-2012-0131036
Nov. 19, 2013 (KR) .................. 10-2013-0140931

(51) Int. Cl.
| | | |
|---|---|---|
| *H01M 2/16* | (2006.01) | |
| *C01B 33/32* | (2006.01) | |
| *H01M 2/14* | (2006.01) | |
| *H01M 10/052* | (2010.01) | |
| *H01M 10/0566* | (2010.01) | |

(52) U.S. Cl.
CPC .......... *H01M 2/1646* (2013.01); *C01B 33/32* (2013.01); *H01M 2/145* (2013.01); *H01M 10/052* (2013.01); *H01M 10/0566* (2013.01); *Y10T 428/2982* (2015.01)

(58) Field of Classification Search
CPC ..... C01B 33/32; H01M 2/145; H01M 2/1646; H01M 10/052; H01M 10/0566; Y10T 428/2982
See application file for complete search history.

(56) References Cited

U.S. PATENT DOCUMENTS

| | | | |
|---|---|---|---|
| 3,379,570 A | | 4/1968 | Berger et al. |
| 4,244,898 A | | 1/1981 | Bandyopadhyay et al. |
| 5,426,006 A | | 6/1995 | Delnick et al. |
| 5,514,494 A | | 5/1996 | Stempin et al. |
| 5,656,391 A | | 8/1997 | Hambitzer et al. |
| 6,306,545 B1 | * | 10/2001 | Carlson ................ B01D 71/025 429/247 |
| 2002/0092155 A1 | | 7/2002 | Carlson et al. |
| 2007/0099072 A1 | | 5/2007 | Hennige et al. |
| 2007/0122716 A1 | * | 5/2007 | Seo ..................... H01M 2/1646 429/251 |
| 2008/0032197 A1 | | 2/2008 | Horpel et al. |
| 2010/0261803 A1 | * | 10/2010 | Bismarck .............. C08F 292/00 521/76 |
| 2010/0291293 A1 | * | 11/2010 | Hennige ............. H01M 2/1646 427/126.4 |
| 2011/0165457 A1 | | 7/2011 | Prochazka, Jr. et al. |
| 2012/0100440 A1 | * | 4/2012 | Narula ................ H01M 2/1646 429/405 |

FOREIGN PATENT DOCUMENTS

| | | | |
|---|---|---|---|
| EP | 0523840 A1 | 1/1993 | |
| EP | 1826842 A1 | 8/2007 | |
| JP | H097575 A | 1/1997 | |
| JP | 2001015389 A | 1/2001 | |
| JP | 3333207 B2 | 10/2002 | |
| JP | 2008517435 A | 5/2008 | |
| KR | 100643210 B1 | 11/2006 | |
| KR | 20070019958 A | 2/2007 | |
| KR | 20070083975 A | 8/2007 | |
| KR | 100980590 B1 | 9/2010 | |
| WO | WO 2012-138671 | * 10/2012 | ............... B28B 1/50 |

OTHER PUBLICATIONS

Wang et al. "An inorganic membrane as a separator for a lithium-ion battery." Journal of Power Sources 196 (2011) 8651-8655, available Jun. 2011.*
International Search Report for PCT/KR2013/010518 dated Mar. 26, 2014.
Supplemental Search Report from European Application No. 13 85 4694, dated Sep. 18, 2015.
Zhang Haifei et al, "Unform emulsion-templated silica beads with high pore volume and hierarchial porosity." Advanced Materials, Wiley—VCH Verlag GmbH & Co., KGAA, DE, vol. 15, No. 1, Jan. 3, 2003, pp. 78-81, XP002284858, ISSN 0935-9648, DOI: 10.1002/ADMA.200390017.
Silverstein, Michael S., "Emulsion-templated porous polymers: A retrospective perspective." Polymer, Elsevier Science Publishers B.V. GB, vol. 55, No. 1, Sep. 11, 2013, pp. 304-320, XP028549218, ISSN: 0032-3861, DOI: 10.1016/J.POLYMER.2013.08.068.
Extended Search Report from European Application No. 13854694. 0, dated Jan. 18, 2016.

* cited by examiner

*Primary Examiner* — Michael Dignan
(74) *Attorney, Agent, or Firm* — Lerner, David, Littenberg, Krumholz & Mentlik, LLP

(57) ABSTRACT

Disclosed are a separator for an electrochemical device substantially comprising inorganic particles to provide an excellent mechanical strength, an electrochemical device comprising the same, and a method of manufacturing the separator using a high internal phase emulsion (HIPE).

20 Claims, No Drawings

SEPARATOR FOR ELECTROCHEMICAL DEVICE AND MANUFACTURING METHOD THEREOF

CROSS-REFERENCE TO RELATED APPLICATION

The present application is a continuation of International Application No. PCT/KR2013/010518 filed on Nov. 19, 2013, which claims priority under 35 USC 119(a) to Korean Patent Application No. 10-2012-0131036 tiled on Nov. 19, 2012 in the Republic of Korea and Korean Patent Application No. 10-2013-0140931 filed on Nov. 19, 2013 in the Republic of Korea, the disclosure of which is incorporated herein by reference.

TECHNICAL FIELD

The present disclosure relates to a separator for an electrochemical device and a manufacturing method thereof, and more particularly, to a separator for an electrochemical device that is free of an organic binder polymer compound and substantially consists of only inorganic particles, an electrochemical device comprising the same, and a method of manufacturing the separator using a high internal phase emulsion (HIPE).

BACKGROUND ART

Recently, there has been growing interest in energy storage technologies in the field of electrochemical devices. As the application fields of energy storage technologies have been extended to mobile phones, camcorders, notebook computers, and even electric cars, efforts have increasingly been made towards the research and development of batteries. In this aspect, electrochemical devices have attracted the most attention. The development of rechargeable secondary batteries has been the focus of particular interest.

Many companies are currently producing lithium secondary batteries due to their advantages of a higher operating voltage and a higher energy density than a traditional Ni-MH battery using an aqueous electrolyte solution; however, lithium secondary batteries each exhibit different safety characteristics. Particularly, a separator has posed a problem that an internal short circuit is caused by its damage, resulting in an explosion and the like. In a case of a lithium secondary battery using a polyolefin-based material as a separator material, due to the polyolefin-based material having a melting point equal to or less than 200° C., a separator is found to shrink or melt, causing a short circuit between both electrodes when the battery increases in its temperature by an internal and/or external stimuli.

In an attempt to solve the problem in the art, a separator manufactured by coating inorganic particles and a binder onto a porous substrate of polyolefin and the like has been proposed; however, the battery performance degrades due to the binder whereas there is still a demand for improvements in mechanical properties of the separator.

An organic binder polymer compound commonly used as a binder in the art may include, for example, polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide, singularly or in combination.

Korean Patent Application Laid-open Publication No. 10-2007-0083975A and Korean Patent Application Laid-open Publication No. 10-2007-0019958A proposed a separator in which a porous coating layer formed from a mixture of insulating filler particles and a binder polymer is provided on a porous substrate and a material having a shut-down function is added to the porous coating layer, to enhance the battery safety, and attempts have been made to use engineering plastics having high heat resistance as a separator material, however the prior arts were not satisfactory in terms of mechanical properties, simplification of a manufacturing process, and costs.

DISCLOSURE

Technical Problem

The present disclosure is directed to providing a separator for an electrochemical device that comprises inorganic particles as an ingredient, but does not comprise an organic binder polymer compound which causes deterioration in battery performance, to prevent a thermal shrinkage phenomenon of polyolefin-based resin or the like without degradation in battery performance, and a manufacturing method thereof.

Technical Solution

According to an embodiment of the present disclosure, there is provided a separator for an electrochemical device substantially consisting of inorganic particles, wherein pores having a diameter in a range of 0.01 to 10 µm are formed by interstitial volumes between the inorganic particles.

The separator tier the electrochemical device may be substantially free of an organic binder polymer compound.

The inorganic particles may have a pore diameter in a range of 0.05 to 1 µm and a porosity in a range of 30 to 95%.

The inorganic particles may include one selected from the group consisting of alumina, silica, titania and zirconia, or mixtures thereof.

The inorganic particles may have a density in a range of 1 to 4 g/cc and a surface area in a range of 10 to 50 m²/g.

The separator for the electrochemical device may further comprise one or more types of cations selected from the group consisting of lithium, sodium, and ammonium.

According to an embodiment of the present disclosure, there is provided an electrochemical device comprising a cathode, an anode, a separator interposed between the cathode and the anode, and an electrolyte solution, wherein the separator is the foregoing-described separator.

The electrochemical device may be a lithium secondary battery.

According to an embodiment of the present disclosure, there is provided a method of manufacturing a separator for an electrochemical device, comprising forming a high internal phase emulsion (HIPE), in the presence of a surfactant, containing a dispersion of an inorganic precursor as an external phase, coating the emulsion onto a substrate, gelling the external phase of the emulsion, and detaching a film substantially consisting of inorganic particles formed on the substrate.

The method may further comprise calcining the gelled inorganic precursor.

The surfactant may be selected from the group consisting of a non-ionic surfactant, a cationic surfactant, and an anionic surfactant.

The inorganic precursor may include oxide, alkoxide or hydroxide of an inorganic matter selected from the group consisting of alumina, silica, titania, zirconia, and mixtures thereof.

The inorganic precursor may be present in an amount of 1 to 100 volume % based on a continuous phase of the HIPE.

One or more types of cations selected from the group consisting of lithium, sodium, and ammonium may be contained in an aqueous phase along with the inorganic precursor.

Advantageous Effects

A separator for an electrochemical device according to the present disclosure is substantially consisting of only inorganic particles and therefore strong against external impact or rises in temperature, and due to proper pore formation, are advantageous to impregnation with an electrolyte solution and movement of a lithium ion. Also, since the separator is free of an organic binder polymer compound, degradation in battery performance caused by an organic binder polymer compound is avoided. As a result, an electrochemical device employing the separator of the present disclosure has remarkably improved stability and performance.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just embodiments for the purpose of illustrations only, not intended to limit the scope of the disclosure, so it should be understood that other equivalents and modifications could be made thereto without departing from the spirit and scope of the disclosure.

The following terms as used herein are understood as representing the following meaning.

The term "HIPE" or "high internal phase emulsion" represents an emulsion having an internal phase higher than or equal to 70% of the volume of the emulsion.

The term "water-in-oil emulsion" as used herein represents a dispersion in which a discontinuous oil 'internal' phase is dispersed in a continuous aqueous 'external' phase, and the term "oil-in-water emulsion" represents a dispersion in which a discontinuous aqueous 'internal' phase is dispersed in a continuous oil 'external' phase. Unless otherwise mentioned in the present disclosure, the term "emulsion" is understood as indicating both a water-in-oil emulsion and an oil-in-water emulsion.

The term "surfactant" as used herein represents a surfactant that may act as an emulsifier having sufficient reactivity to cause a polymerization reaction so that it becomes a portion of a polymer backbone.

A separator for an electrochemical device according to the present disclosure substantially consists of inorganic particles. That is, the separator for the electrochemical device is free of an organic binder polymer compound that has been used in the art.

In the present disclosure, the 'inorganic particle' is not limited to a specific type of inorganic particle if it may form a film from a HIPE and can be used as a separator material for an electrochemical device.

A non-limiting example of an inorganic precursor may include oxide, alkoxide or hydroxide of an inorganic matter selected from the group consisting of alumina, silica, titania, zirconia, and mixtures thereof. Preferably, the inorganic precursor may be dispersed in an aqueous dispersion, and its amount may be from 1 to 100 volume % based on a continuous phase of a HIPE.

Pores having a diameter in a range of 0.01 to 10 μm are formed by interstitial volumes between the inorganic particles. The pores of the above numerical range enable a smooth movement of a lithium ion. In the specification, the 'interstitial volume' represents a 'closed packed or densely packed structure of inorganic particles'.

A porosity of the inorganic particles may be variously adjusted within a range of 30 to 95% or 50 to 90%, and when the porosity of the porous inorganic particles is less than 30%, permeation of an electrolyte solution into the pores is inadequate and consequently battery performance improvement is insignificant, and when the porosity is greater than 95%, the mechanical strength of the particles may reduce. This pore structure serves as an additional lithium ion channel and a space for impregnation with an electrolyte solution, contributing to battery performance improvement.

The separator for the electrochemical device according to the present disclosure is substantially free of an organic binder polymer compound. Thereby, a step of applying an organic binder polymer compound is unnecessary and an issue with electrical conductivity reduction caused by an organic binder polymer compound is not raised. In case a calcination process is performed, a bond between the inorganic particles is formed through the calcination process, and even though a calcination process is not carried out, a bond between the inorganic particles may be formed through a sol-gel process of the inorganic particles during drying.

The porous inorganic particles have a significant increase in surface area by the plural pores present in the particles themselves, leading to density reduction. Actually, in case inorganic particles having a high density are used, the inorganic particles are difficult to disperse upon coating and unfavorably have an increase in weight in the manufacture of the battery, and accordingly, as low a density as possible is preferred. For example, a density of the porous inorganic particles may be in a range of 1 to 4 g/cc, and a Brunauer, Emmett & Teller (BET) specific surface area may be in a range of 10 to 50 m$^2$/g.

A size of the inorganic particles is not specially limited, but may be in a range of 0.1 to 10 μm, more preferably, 0.2 to 0.8 μm. When the above range is satisfied, it is easy to adjust the structure and physical properties of the separator due to appropriate dispersion, and a separator manufactured using the same solid content has a suitable thickness so that a phenomenon in which mechanical properties deteriorate and the like is prevented, and a proper pore size is achieved.

Also, the inorganic particles may have a pore diameter in a range of 0.05 to 1 μm. When the pore diameter of the porous inorganic particles is less than 0.05 μm, permeation of an electrolyte solution into the pores may not be smooth, and when the pore diameter is greater than 1 μm, the volume of the separator may unnecessarily increase.

According to an aspect of the present disclosure, one or more types of cations selected from the group consisting of lithium, sodium, and ammonium may make up of a porous substrate together with the inorganic particles.

The separator of the present disclosure substantially consists of only the inorganic particles. In a gelled inorganic particle layer formed during a manufacturing process, the surfactant may be removed through a washing process with a residual amount left behind, and may be substantially completely removed through a calcinations process.

Accordingly, 'substantially consisting of inorganic particles' as used herein should be understood as implying that, although impurities are included, the impurities are included in such an amount that can be regarded as an unintended impurity content and the rest consists of inorganic particles.

The thickness of the separator of the present disclosure may be adjusted according to the object, and for example, the separator of the present disclosure may be manufactured to have a thickness in a range of 1 to 100 μm.

The separator of the present disclosure may be manufactured by a method using a HIPE. That is, according to one embodiment of the present disclosure, the separator of the present disclosure may be manufactured by a method comprising forming an oil-in-water HIPE, in the presence of a surfactant, containing a dispersion of an inorganic precursor as an external phase, coating the emulsion onto a substrate, gelling the external phase of the emulsion, and detaching a film substantially consisting of inorganic particles formed on the substrate.

According to another embodiment of the present disclosure, there is provided a method of manufacturing a separator for an electrochemical device comprising forming an oil-in-water RIPE, in the presence of a surfactant, containing an oil phase higher than or equal to 70 volume % as an internal phase and an aqueous dispersion of an inorganic precursor as an external phase, coating the emulsion onto a substrate, gelling the external phase of the emulsion, and detaching a film substantially consisting of inorganic particles formed on the substrate.

According to still another embodiment of the present disclosure, there is provided a method of manufacturing a separator for an electrochemical device comprising forming an oil-in-water HIPE, in the presence of a surfactant, containing an oil phase higher than or equal to 70 volume % as an internal phase and an aqueous dispersion of metal oxide as an external phase wherein a polymer bead is mixed in the oil internal phase, coating the emulsion onto a substrate, gelling the external phase of the emulsion, performing calcination, and detaching a film substantially consisting of inorganic particles formed on the substrate. The calcination step and the substrate detachment step may be performed in a reverse order.

The method may further comprise drying the gelled inorganic precursor. Also, the method may further comprise calcining the gelled inorganic precursor or the dried inorganic precursor.

The HIPE may be stabilized by using the surfactant. For example, the surfactant usable in the present disclosure may include, but is not limited to, a non-ionic surfactant, for example, sorbitan ester including sorbitan monooleate and sorbitan monolaurate; glycerol ester, for example, glycerol monooleate; diglycerol monooleate; PEG 200 dioleate, a fatty acid partial ester of polyglycerol; a cationic surfactant, for example, an ammonium salt; and an anionic surfactant, for example, a particular organic sulfate and a sulfonate compound.

There is no special limitation on a usage amount of the surfactant, but the surfactant is used in a sufficient amount to form an emulsion, and generally, the amount is in a range of 0.1 to 25 wt % or 0.1 to 15 wt % based on the weight of the oil phase.

The polymer bead included in a different phase from the inorganic precursor, for example, an oil phase, is used to form the separator into a porous type. The polymer bead may be formed from, for example, polyacrylamide, but is not limited thereto.

A non-limiting example of the oil used in the present disclosure may include, but is not limited to, styrene, divinyl benzene, and the like.

The foregoing-described HIPE is coated on the substrate. Here, the 'substrate' represents a substrate on which the emulsion is coated during the process, and may be a material commonly used in the art. A non-limiting example of a method of coating the HIPE onto the substrate may include spraying, ink-jet printing, laser printing, screen printing, dispensing, and the like, and their application method is performed by general methods known in the art in accordance with the object of the present disclosure.

Subsequently, the continuous phase of the emulsion is gelled, and as a gelling method, a gelling agent may be used or a natural curing method may be used, however the gelling method is not limited thereto.

Subsequently, the gelled inorganic particles may be dried and calcined.

The drying may be performed by natural drying, or may be performed within a temperature range in which the phase is not broken, for example, a range of 20 to 100° C.

The calcination ensures a more firm bond between the inorganic particles as well as removes the surfactant and the polymer bead present in the gelled inorganic particle layer. The calcination may be performed within a range of 350 to 700° C., but a specific calcination temperature may change based on the inorganic particles used.

The film-type separator of the present disclosure manufactured through the above process may include surfactant residues and the like, but since their content is just traces, the separator of the present disclosure substantially consists of the inorganic particles.

The resulting separator of the present disclosure may be a separator for an electrochemical device, preferably, a lithium secondary battery.

Also, the present disclosure provides an electrochemical device including a cathode, an anode, the separator of the present disclosure interposed between the cathode and the anode, and an electrolyte solution.

The electrochemical device includes all devices facilitating electrochemical reactions, specifically, all types of primary and secondary batteries, fuel cells, solar cells, capacitors, and the like. Particularly, among the secondary batteries, lithium secondary batteries are preferred, and examples of the lithium secondary batteries include lithium metal secondary batteries, lithium ion secondary batteries, lithium polymer secondary batteries, lithium ion polymer secondary batteries, and the like.

The electrochemical device may be fabricated by a common method known in the art, and for example, the electrochemical device may be fabricated by interposing the separator between the cathode and the anode to form an electrode assembly, placing the electrode assembly in a battery casing, and subsequently, injecting an electrolyte solution in the battery casing.

There is no special limitation on the anode, the cathode, the electrolyte solution to be applied together with the separator of the present disclosure, and common ones usable in a conventional electrochemical device may be used.

Manufacturing Example

A silicate dispersion was obtained by dispersing neutral silicate and a lithium salt $LiPF_6$ in water.

A surfactant cetyl trimethyl ammonium bromide was added to styrene, and the silicate dispersion was added thereto, thereby forming a HIPE. The formed HIPE was coated on a substrate, followed by natural drying and calcination at 550° C., thereby yielding a film-type separator.

What is claimed is:

1. A separator for an electrochemical device,
    wherein the separator is in a form of a detached film substantially consisting of inorganic particles, and is configured to be interposed between a cathode and an anode,
    wherein the inorganic particles have a size from 0.2 to 0.8 µm,
    wherein bonds between the inorganic particles are formed and pores having a diameter in a range of 0.01 to 10 µm are formed by interstitial volumes between the inorganic particles, and
    wherein the separator is free of an organic binder polymer compound had has a thickness in a range of 1 to 100 µm,
    wherein the separator is produced by forming a high internal phase emulsion containing the inorganic particles.

2. The separator for the electrochemical device according to claim 1, wherein the separator has a porosity in a range of 30 to 95%.

3. The separator for the electrochemical device according to claim 1, wherein the inorganic particles include one selected from the group consisting of alumina, silica, titania and zirconia, or mixtures thereof.

4. The separator for the electrochemical device according to claim 1, wherein the inorganic particles has a density in a range of 1 to 4 g/cc and a Brunauer, Emmett & Teller (BET) specific surface area in a range of 10 to 50 $m^2/g$.

5. The separator for the electrochemical device according to claim 1, further comprising one or more types of cations selected from the group consisting of lithium, sodium, and ammonium.

6. An electrochemical device comprising a cathode, an anode, a separator interposed between the cathode and the anode, and an electrolyte solution,
    wherein the separator is the separator of claim 1.

7. The electrochemical device according to claim 6, wherein the electrochemical device is a lithium secondary battery.

8. A method of manufacturing the separator of claim 1 for an electrochemical device, the method comprising:
    forming a high internal phase emulsion (HIPE), in the presence of a surfactant, containing a dispersion solution of an inorganic precursor as an external phase;
    coating the emulsion onto a substrate;
    gelling the external phase of the emulsion; and
    detaching a film substantially consisting of inorganic particles formed on the substrate.

9. The method of manufacturing the separator for the electrochemical device according to claim 8, wherein an oil phase higher than or equal to 70 volume % is contained as an internal phase, and the dispersion solution of the inorganic precursor is an aqueous dispersion.

10. The method of manufacturing the separator for the electrochemical device according to claim 8, further comprising:
    calcining the gelled inorganic precursor.

11. The method of manufacturing the separator for the electrochemical device according to claim 10, wherein an oil phase higher than or equal to 70 volume % is contained as an internal phase, the dispersion solution of the inorganic precursor is an aqueous dispersion, and the internal phase contains a polymer bead.

12. The method of manufacturing the separator for the electrochemical device according to claim 8, wherein the surfactant is selected from the group consisting of a non-ionic surfactant, a cationic surfactant, and an anionic surfactant.

13. The method of manufacturing the separator for the electrochemical device according to claim 8, wherein the inorganic precursor includes oxide, alkoxide or hydroxide of an inorganic matter selected from the group consisting of alumina, silica, titania, zirconia, and mixtures thereof.

14. The method of manufacturing the separator for the electrochemical device according to claim 8, wherein the inorganic precursor is present in an amount of 1 to 100 volume % based on a continuous phase of the HIPE.

15. The method of manufacturing the separator for the electrochemical device according to claim 8, wherein one or more types of cations selected from the group consisting of lithium, sodium, and ammonium are contained in an aqueous phase along with the inorganic precursor.

16. A separator for an electrochemical device,
    wherein the separator is a detached film substantially consisting of inorganic particles,
    wherein pores having a diameter in a range of 0.01 to 10 µm are formed by interstitial volumes between the inorganic particles,
    wherein the separator is free of an organic binder polymer compound,
    wherein the inorganic particles have a size from 0.2 to 0.8 µm, and the separator has a thickness in a range of 1 to 100 µm, and wherein the separator is produced by forming a high internal phase emulsion containing the inorganic particles.

17. The separator for the electrochemical device according to claim 16, wherein the separator has a porosity in a range of 30 to 95%.

18. The separator for the electrochemical device according to claim 16, wherein the inorganic particles include one selected from the group consisting of alumina, silica, titania and zirconia, or mixtures thereof.

19. The separator for the electrochemical device according to claim 16, wherein the inorganic particles has a density in a range of 1 to 4 g/cc and a Brunauer, Emmett & Teller (BET) specific surface area in a range of 10 to 50 $m^2/g$.

20. An electrochemical device comprising a cathode, an anode, a separator interposed between the cathode and the anode, and an electrolyte solution,
    wherein the separator is a separator according to claim 16.

* * * * *